United States Patent
Kim et al.

(10) Patent No.: US 10,986,112 B2
(45) Date of Patent: Apr. 20, 2021

(54) METHOD FOR COLLECTING CYBER THREAT INTELLIGENCE DATA AND SYSTEM THEREOF

(71) Applicant: KOREA INTERNET & SECURITY AGENCY, Naju-si (KR)

(72) Inventors: Nak Hyun Kim, Naju-si (KR); Seul Gi Lee, Naju-si (KR); Hyei Sun Cho, Naju-si (KR); Byung Ik Kim, Naju-si (KR); Jun Hyung Park, Naju-si (KR)

(73) Assignee: KOREA INTERNET & SECURITY AGENCY, Naju (KR)

( * ) Notice: Subject to any disclaimer, the term of this patent is extended or adjusted under 35 U.S.C. 154(b) by 236 days.

(21) Appl. No.: 16/174,013

(22) Filed: Oct. 29, 2018

(65) Prior Publication Data
US 2019/0166143 A1 May 30, 2019

(30) Foreign Application Priority Data
Nov. 27, 2017 (KR) .................. 10-2017-0159223

(51) Int. Cl.
*H04L 29/06* (2006.01)
*H04L 12/26* (2006.01)
(Continued)

(52) U.S. Cl.
CPC ...... *H04L 63/1425* (2013.01); *G06F 9/45558* (2013.01); *G06F 21/577* (2013.01);
(Continued)

(58) Field of Classification Search
CPC .................................................. G06F 16/254
See application file for complete search history.

(56) References Cited

U.S. PATENT DOCUMENTS

| 8,566,279 B1 * | 10/2013 | Martin | .................. | G06F 16/254 |
| | | | | 707/625 |
| 10,681,068 B1 * | 6/2020 | Galliano | ................. | G06F 30/20 |

(Continued)

FOREIGN PATENT DOCUMENTS

| KR | 20160100626 A | 8/2016 |
| KR | 10-1681855 B1 | 12/2016 |

(Continued)

OTHER PUBLICATIONS

Korean Intellectual Property Office, Notice of Allowance for Korean Patent Application No. 10-2017-0159223, dated Oct. 8, 2018.

(Continued)

*Primary Examiner* — Christopher C Harris
(74) *Attorney, Agent, or Firm* — Socal IP Law Group LLP; Jonathan Pearce

(57) ABSTRACT

Disclosed herein are a method and system for collecting cyber threat intelligence (CTI) data. The system includes a management server that determines agent configuration values associated with an OSINT providing source, an agent that receives the agent configuration values from the management server, performs a data collection task for collecting the CTI data based on the agent configuration values, and transmits the CTI data and data collection status information to the management server, a threat information database where which the CTI data is logged, and a system database where the data collection status information is logged.

11 Claims, 9 Drawing Sheets

(51) Int. Cl.
*G06F 9/455* (2018.01)
*G06F 21/57* (2013.01)
*H04L 12/24* (2006.01)

(52) U.S. Cl.
CPC ........ *H04L 41/046* (2013.01); *H04L 41/0806* (2013.01); *H04L 43/06* (2013.01); *H04L 43/0894* (2013.01); *G06F 2009/45595* (2013.01)

(56) References Cited

U.S. PATENT DOCUMENTS

| | | | | |
|---|---|---|---|---|
| 2002/0038430 | A1* | 3/2002 | Edwards | H04L 63/1416 726/26 |
| 2002/0093923 | A1* | 7/2002 | Bouet | H04L 29/06 370/328 |
| 2011/0246816 | A1* | 10/2011 | Hsieh | H04L 67/1042 714/4.12 |
| 2013/0173539 | A1* | 7/2013 | Gilder | G06F 16/27 707/622 |
| 2016/0119365 | A1* | 4/2016 | Barel | G06F 16/84 726/12 |
| 2016/0366174 | A1* | 12/2016 | Chernin | H04L 63/04 |
| 2017/0220383 | A1* | 8/2017 | Raj | G06F 9/4881 |
| 2017/0220403 | A1* | 8/2017 | Maag | G06F 11/3692 |
| 2017/0228658 | A1* | 8/2017 | Lim | H04L 63/1433 |
| 2018/0219884 | A1* | 8/2018 | Beresna | H04L 63/1425 |
| 2019/0138419 | A1* | 5/2019 | Poghosyan | G06F 11/3006 |

FOREIGN PATENT DOCUMENTS

| | | |
|---|---|---|
| KR | 20170089128 A | 8/2017 |
| KR | 20170089279 A | 8/2017 |
| KR | 20170091249 A | 8/2017 |

OTHER PUBLICATIONS

Korean Intellectual Property Office, First Office Action for Korean Patent Application No. 10-2017-0159223, dated Apr. 1, 2018.

* cited by examiner

METHOD FOR COLLECTING CYBER THREAT INTELLIGENCE DATA AND SYSTEM THEREOF

This application claims priority from Korean Patent Application No. 10-2017-0159223 filed on Nov. 27, 2017 in the Korean Intellectual Property Office, the disclosure of which is incorporated herein by reference in its entirety.

BACKGROUND

1. Field of the Disclosure

The present disclosure relates to a method and system for collecting cyber threat intelligence (CTI) data. More specifically, the present disclosure relates to a method, device and system for efficiently collecting cyber threat intelligence data provided from open source intelligence (OSINT) providing sources.

2. Description of the Related Art

An infringement incident by a cyber attack refers to an action that causes harm by leaking information or paralyzing services using malicious operations such as hacking and infecting by viruses or malicious codes. Infringement incidents by cyber attacks are increasingly occurring in a variety of ways. Damages resulted from cyber attacks are also becoming more serious and widespread. Therefore, it is necessary to establish prevention and countermeasures against infringement incidents caused by cyber attacks.

Recent infringement incidents have a tendency that an attacker continuously attacks by reusing the attack resources she/he possesses after a certain period of time. Due to such tendency of infringing incidents, by collecting and analyzing various information related to recent infringement incidents, it is possible to systematically predict future infringement incidents and to respond swiftly by using the predicted results.

CTI data, which is infringement incident information, is provided through a variety of open source intelligence (OSINT) providing sources, that is, various information sharing channels. CTI data provided from different OSINT providing sources may be collected in different manners and may have different formats. Accordingly, in order to establish a system for collecting CTI data, an agent that collects CTI data is developed for each OSINT providing source, and CTI data is collected using the agent.

To do so, there is a burden to develop an agent for every OSINT providing source since the CTI data provided by the OSINT providing source is vast, and there are various OSINT providing sources. In addition, if an OSINT providing source is added or disappears, or if the format of CTI data provided by an OSINT providing source is changed, there is a problem that an agent must be developed again.

In addition, since the task of collecting CTI data from various OSINT providing sources is not performed at all times, there may be idle resources in the system for collecting CTI data. Under the circumstances, what is required is a method for collecting CTI data by utilizing the resources of the system more efficiently.

SUMMARY

Aspects of the present disclosure provide a method and device capable of collecting CTI data without re-developing an agent even if an information sharing channel is changed.

Aspects of the present disclosure also provide a method and device capable of collecting CTI data by utilizing system resources more efficiently.

This and other aspects, embodiments and advantages of the present disclosure will become immediately apparent to those of ordinary skill in the art upon review of the Detailed Description and Claims to follow.

According to an aspect of the present disclosure, there is provided a data collection system for collecting cyber threat intelligence (CTI) data provided from an open source intelligence (OSINT) providing source, the system comprising, a management server configured to determine agent configuration values associated with the OSINT providing source, an agent configured to receive the agent configuration values from the management server, to perform a data collection task for collecting the CTI data based on the agent configuration values, and to transmit the CTI data and data collection status information to the management server, a threat information database where which the CTI data is logged, and a system database where the data collection status information is logged.

According to another aspect of the present disclosure, there is provided a management server for collecting cyber threat intelligence (CTI) data provided from an open source intelligence (OSINT) providing source, the server comprising, an environment configuring unit configured to determine agent configuration values associated with the OSINT providing source, an external communications interface configured to transmit the agent configuration values to an agent and to receive data collection status information and the CTI data from the agent, a distributed processing determining unit configured to determine a workload for the OSINT providing source based on the data collection status information and to determine whether to perform distributed processing of a data collection task for the OSINT providing source based on the workload, and a distributed processing performing unit configured to determine agent configuration values so that the agent performs the distributed processing if it is determined to do so.

According to other aspect of the present disclosure, there is provided an agent for collecting cyber threat intelligence (CTI) data provided from an open source intelligence (OSINT) providing source, the agent comprising, an agent manager configured to receive agent configuration values from a management server, to assign the agent configuration values to a collection channel that acquires the CTI data from the OSINT providing source, and to align processes of a data collection task and a collector configured to configure a parser based on the agent configuration values of the collection channel and the aligned processes and to collect the CTI data using the parser.

According to other aspect of the present disclosure, there is provided a method for collecting cyber threat intelligence (CTI) data provided from an open source intelligence (OSINT) providing source, the method comprising, determining agent configuration values associated with the OSINT providing source, performing a data collection task for collecting the CTI data based on the agent configuration values, acquiring data collection status information indicative of a progress of the data collection task and logging the CTI data into a threat information database and the data collection status information in a system database.

According to other aspect of the present disclosure, there is provided a computer program stored in a non-transitory computer-readable storage medium, wherein instructions of the computer program, when executed by a data collection system, cause the system to perform, determining agent configuration values associated with an open source intelligence (OSINT) providing source, performing a data collection task for collecting a cyber threat intelligence (CTI) data based on the agent configuration values, acquiring data collection status information indicative of a progress of the data collection task and logging the CTI data into a threat information database and the data collection status information in a system database.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

It will be understood that the terms "comprise" and/or "comprising" when used herein, specify some stated components, steps, operations and/or elements, but do not preclude the presence or addition of one or more other components, steps, operations and/or elements.

Hereinafter, embodiments of the present disclosure will be described with reference to the attached drawings.

Figure 1:
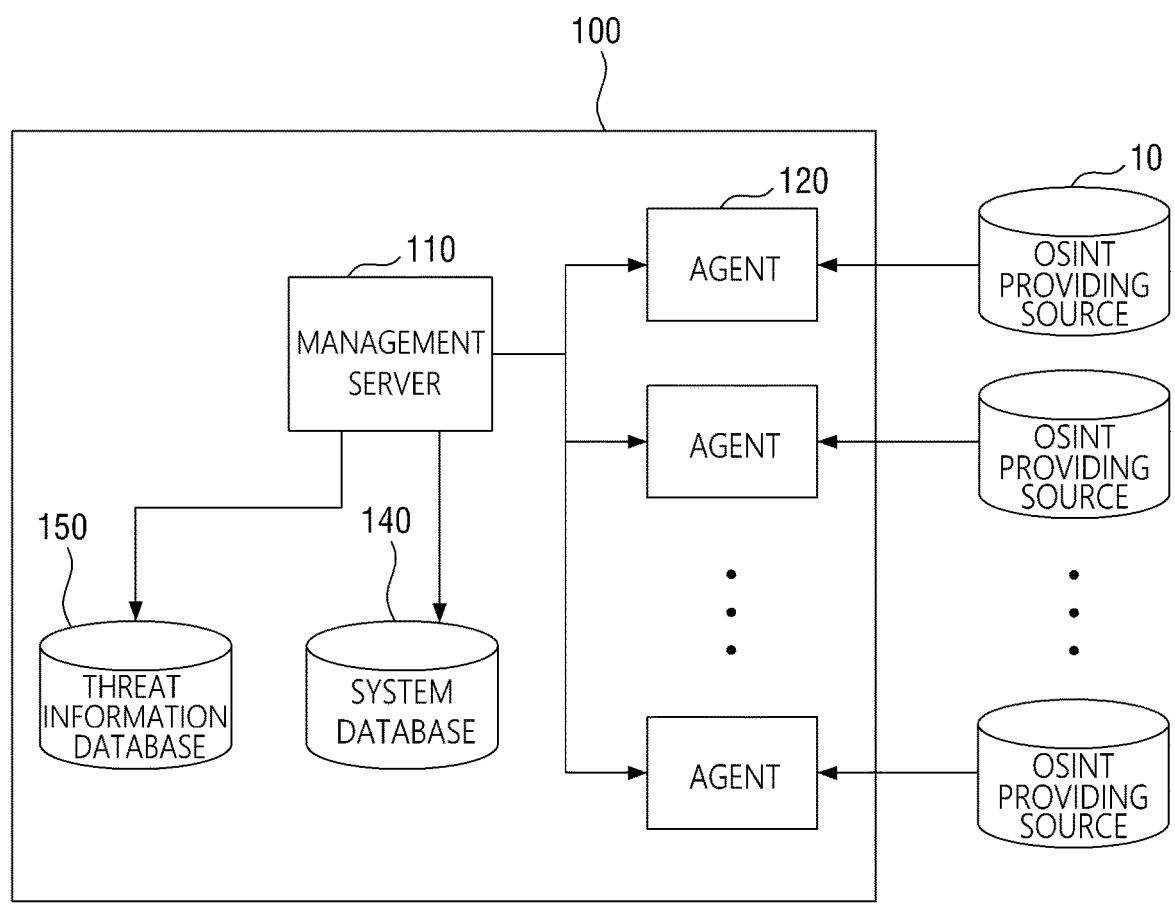
FIG. 1 is a diagram for illustrating a structure of a data collection system according to an exemplary embodiment of the present disclosure.

FIG. 1 is a diagram for illustrating a structure of a data collection system 100 according to an exemplary embodiment of the present disclosure. According to the exemplary embodiment of the present disclosure, the data collection system 100 may include a management server 110, agents 120, a system database 140, and a threat information database 150. It is to be noted that the example shown in FIG. 1 is merely illustrative. The data collection system 100 may further include other elements, or the elements of the data collection system 100 may be integrated into a single element. For example, the management server 110 and the agents 120 may be implemented either as a single computing device or as separate computing devices.

The management server 110 may determine agent configuration values for the agents 120. The management server 110 may determine agent configuration values associated with open source intelligence (OSINT) providing sources 10 from which the agents 120 collect cyber threat intelligence (CTI) data.

The OSINT providing sources 10 may refer to devices that provide CTI data through a web page, a file, or the like. For example, MITER corporation has built common the vulnerabilities and exposures (CVE) database since 1999, and the National Institute of Standards and Technology (NIST) has built the national vulnerability database (NVD). More than 77,000 CVEs have been built by 2016. In the NVD, CVE data are provided in the form of XML files and so on. Besides the NVD, the OSINT providing sources that provide CTI data are available in a variety of formats. For example, there is CTI data that is published on a web page instead of a separate file. Therefore, different OSINT providing sources 10 have different manners of transmitting CTI data, different data formats, different locations of CTI data in the entire data, etc. Accordingly, the agent 120 has to be provided for each of the OSINT providing sources 10 according to the data collecting manner, format, etc.

The agent 120 may receive data according to the manner how the OSINT providing source 10 transmits the CTI data and may extract the CTI data from the received data using a parser associated with the format of the received data. The agent 120 may configure a virtual machine (VM) including a parser for collecting CTI data from the OSINT providing source 10. The agent 120 may configure a plurality of VMs for collecting CTI data from a plurality of OSINT providing sources. That is to say, although FIG. 1 shows that the single agent 120 is configured for the single OSINT providing source 10, the single agent 120 may configure a plurality of VMs to collect CTI data from a plurality of OSINT providing sources.

Further, according to an exemplary embodiment of the present disclosure, when there is a great deal of workload of the data collection task performed to collect CTI data from the OSINT providing source 10, a plurality of VMs may process the data collection task by dividing it into sub-tasks. According to an exemplary embodiment of the present disclosure, the management server 110 may determine agent configuration values so that a plurality of VMs can perform distributed processing of the data collection task for a single OSINT providing source 10. The agent 120 may configure a plurality of VMs based on the agent configuration values, such that a data collection task for collecting CTI data can be performed by the operation of the VMs thus configured. The plurality of VMs may be configured in a single agent 120 or may be distributed across different agents.

In addition, according to an exemplary embodiment of the present disclosure, a VM or an agent may be added if a new OSINT providing source is added. According to an exemplary embodiment of the present disclosure, if an OSINT providing source 10 is added, the management server 110 may determine agent configuration values and transmit it to the agent 120 so that the VM is added. According to another exemplary embodiment, the management server 110 may add a new agent 120 and may transmit agent configuration values to the added agent 120. Alternatively, if the OSINT providing source 10 is changed (for example, when the format of the data provided by the OSINT providing source 10 is changed), the management server 110 may determine agent configuration values by reflecting such changes and may transmit it to the agent 120.

Further, unnecessary VMs or agents may be removed. For example, if it is determined that an OSINT providing source 10 does not provide new CTI data, the management server 110 may remove the VM or the agent that collects CTI data from the OSINT providing source 10. As used herein, the expression "adding an agent" refers to adding a VM as well as adding an agent, for convenience of illustration. Similarly, the expression "removing an agent" refers to removing a VM as well as removing an agent. The expression "altering an agent" refers to altering a VM as well as altering an agent.

The management server 110 may receive from the agent 120 a report log including the CTI data collected by the agent 120 and the data collection status information containing information on the progress of the data collection task. The management server 110 may sort the data included in the report log received from the agent 120 into CTI data and the data collection status information and may store the data collection status information in the system database 140 and the CTI data in the threat information database 150.

Figure 2:
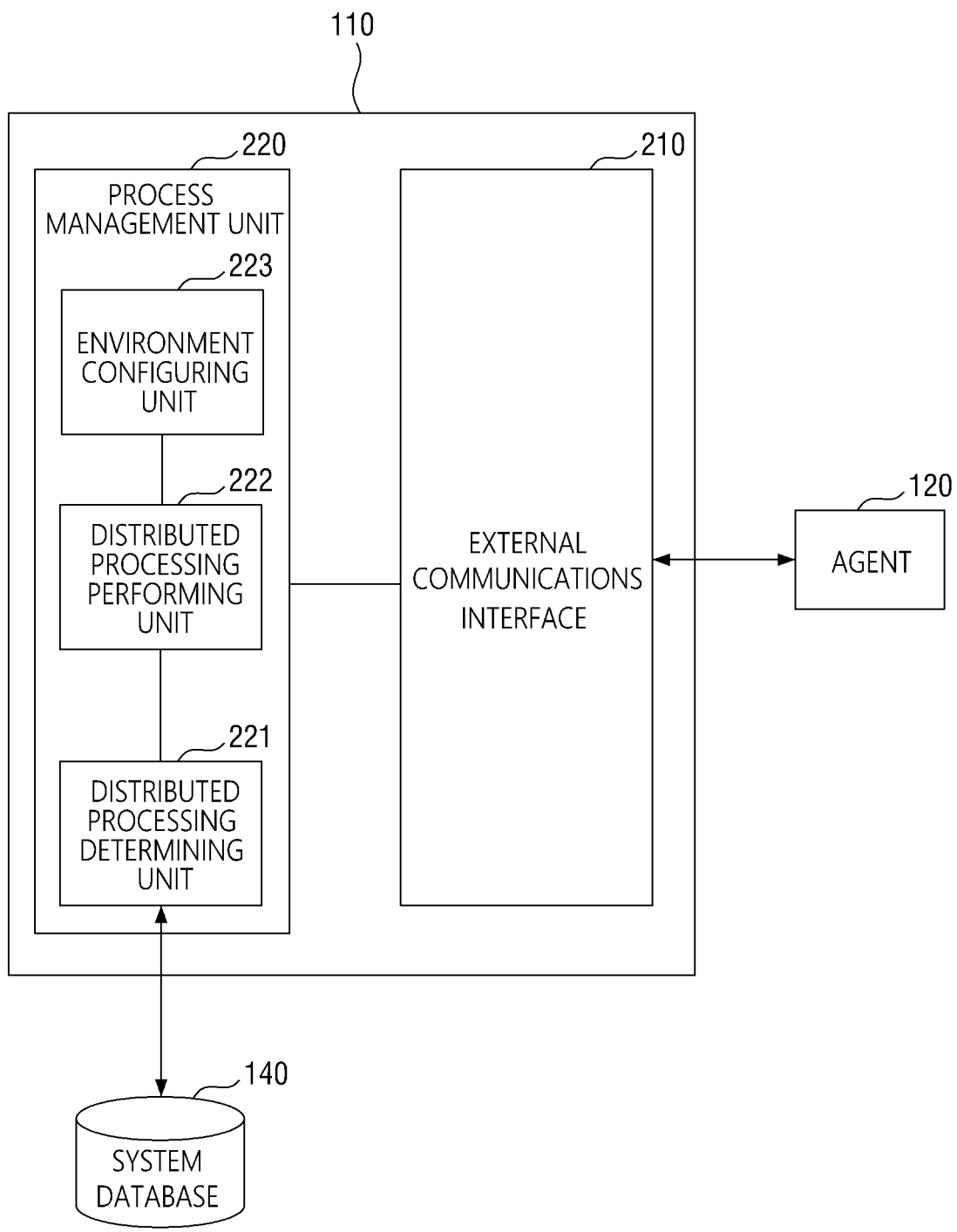
FIG. 2 is a diagram for illustrating a structure of a management server according to an exemplary embodiment of the present disclosure.

FIG. 2 is a diagram for illustrating a structure of a management server 110 according to an exemplary embodiment of the present disclosure. According to the exemplary embodiment of the present disclosure, the management server 110 may include an external communications interface 210 and a process management unit 220. The external communications interface 210 may perform communications with an external device including the agent 120.

The process management unit 220 may control the operation of each of the constituent elements of the management server 110 and may manage the process of the data collection task performed by the agent 120. According to an exemplary embodiment of the present disclosure, the process management unit 220 may include a processor (hardware processor) and a memory from which instructions executed by the processor are loaded. In addition, the process management unit 220 may include a distributed processing determining unit 221, a distributed processing performing unit 222, and an environment configuring unit 223.

The environment configuring unit 223 may determine agent configuration values associated with the OSINT providing source 10 so that the agent 120 can configure the environment in which the OSINT providing source 10 can collect CTI data. The agent configuration values may include information for the agent 120 to receive data from the OSINT providing source 10 and extract the CTI data therefrom.

According to an exemplary embodiment of the present disclosure, the agent configuration values may include a collecting manner configuration value, a data format configuration value, and a data location configuration value. The collecting manner configuration value refers to a value for determining a manner how the agent 120 receives data from the OSINT providing source 10. For example, the collecting manner configuration value may allow the agent 120 to collect CTI data by using one of: crawling that acquires a web page including CTI data using a crawler; API connection that acquires CTI data by connecting the OSINT providing source 10 with the agent 120 using an application program interface (API); a direct input that a user directly inputs the CTI data through an input device; and a shared storage that acquires CTI data from a file stored in the shared storage. In addition, the data format configuration value may be a value for determining the data format of the data received from the OSINT providing source 10. For example, the data format configuration value may indicate one of: a web page in which the received data is written using HTML, a file in JSON, XML, CSV or TXT file format, and a spreadsheet document file. In addition, the location configuration value may be used to indicate the location of the CTI data in the data received from the OSINT providing source 10. For example, the location configuration value may indicate which syntax of the HTML source code the CTI data is located at. For another example, the location configuration value may be used to value indicate which field of a spreadsheet document the CTI data is located at.

The process management unit 220 may transmit the agent configuration values determined by the environment configuring unit 223 to the agent 120 through the external communications interface 210 so that the agent can perform the data collection task of collecting the CTI data. In addition, the process management unit 220 may store the CTI data and the data collection status information received from the agent 120 in the threat information database 150 and the system database 140, respectively, through the external communications interface 210. The data collection status information refers to information indicating a progress of the data collection task. For example, the data collection status information may indicate the amount of packets transmitted/received or processed by the agent 120 in bytes or bps as the agent 120 performs the data collection task.

Further, according to an exemplary embodiment of the present disclosure, if a new OSINT providing source is added, the environment configuring unit 223 may add an additional agent and may provide agent configuration values for the new OSINT providing source to the additional agent. As the environment configuring unit 223 provides the agent configuration values, it is possible to configure an agent capable of collecting CTI data from a new OSINT providing source without newly developing an additional agent. Alternatively, the environment configuring unit 223 may allow an existing agent 120 to add a VM using the agent configuration values for a new OSINT providing source, instead of adding an additional agent.

The environment configuring unit 223 determines whether the agent 120 is being used or not and may remove the agent 120 from the data collection system 100 if it is determined that the agent 120 is not used. According to an exemplary embodiment of the present disclosure, the environment configuring unit 223 may determine whether the agent 120 is being used based on the data collection status information. For example, if there is no workload performed by the agent 120 for a predetermined period of time, the environment configuring unit 223 may remove the agent 120 from the data collection system 100. According to another exemplary embodiment, a list of OSINT providing sources from which CTI data is collected is stored in the system database 140. The environment configuring unit 223 may determine that an agent 120 is not being used which is associated with an OSINT providing source deleted from the list of OSINT providing sources.

The distributed processing determining unit 221 may be determine whether to perform distributed processing of the data collection task to collect CTI data from the OSINT providing source 10 and may determine a distributed processing manner if so. That is to say, the distributed processing determining unit 221 may determine whether to perform distributed processing of a data collection task for each collection channel that collects data. As used herein, the collection channel may refer to a path from which CTI data is collected from an OSINT providing source 10 to an agent. According to an exemplary embodiment of the present disclosure, in order to determine whether to perform distributed processing of a data collection task, the distributed processing determining unit 221 may determine the workload of the data collection task to collect CTI data from the OSINT providing source 10 based on the data collection status information logged in the system database 140. As used herein, the distributed processing determining unit 221 may determine the amount of workload in different ways depending on the type and characteristics of the OSINT providing source 10. Specifically, provided that the same value is included in the data collection status information, if the data provided by an OSINT providing source 10 requires the agent 120 to perform a large amount of work in order to collect CTI data, a larger weight may be assigned to the OSINT providing source 10, so that the data collection task for the OSINT providing source 10 has a larger workload.

Alternatively, according to another exemplary embodiment, the distributed processing determining unit 221 may determine the workload based on predetermined values according to the type and characteristics of the OSINT providing source 10. For example, the distributed processing determining unit 221 may determine that the workload of a data collection task for a first OSINT providing source from which CTI data is collected through the API connection has the value of one, while the workload of a data collect task for a second OSINT providing source from which CTI data is collected through crawling has the value of five.

Alternatively, according to another exemplary embodiment, the distributed processing determining unit 221 may determine the workload of a data collection task based on the period of time in which a VM configured in the agent 120 operates. The period of time in which the VM operates may be included in the data collection status information. For example, the distributed processing determining unit 221 may determine that the workload is three if three VMs operate for one unit time to collect CTI data from an OS INT providing source 10 and may determine that the workload is four if two VMs operate for two unit times. As the distributed processing determining unit 221 determines the workload of a data collection task based on the period of time in which the VMs operate, it is possible to determine the workload of the data collection task for the OSINT providing source 10 when the type and characteristics of the OSINT providing source 10 are not identified.

The distributed processing performing unit 222 may perform the distributed processing of the data collection task according to the determination of the distributed processing determining unit 221. The distributed processing performing unit 222 may control the agent so that the agent processes the data collection task by dividing it into sub-tasks if it is determined that distributed processing of the data collection task is to be performed. In order to allow an agent to perform distributed processing of a data collection task, the distributed processing performing unit 222 may check the distributed processing setting for each collection channel, may create a task queue on the server when the workload for each collection channel is determined, and then may support the agent so that the task of each channel can be distributed. In addition, the distributed processing performing unit 222 may query if there is an idle VM, that is, an available VM for performing the distributed processing of the data collection task. If there is an idle VM, the distributed processing performing unit 222 may control the idle VM so that it performs distributed processing of the data collection task. According to an exemplary embodiment of the present disclosure, if there is a data collection task for distributed processing but no idle VM, the distributed processing performing unit 222 may request the environment configuring unit 223 to add an additional agent to perform the distributed processing.

Figure 3:
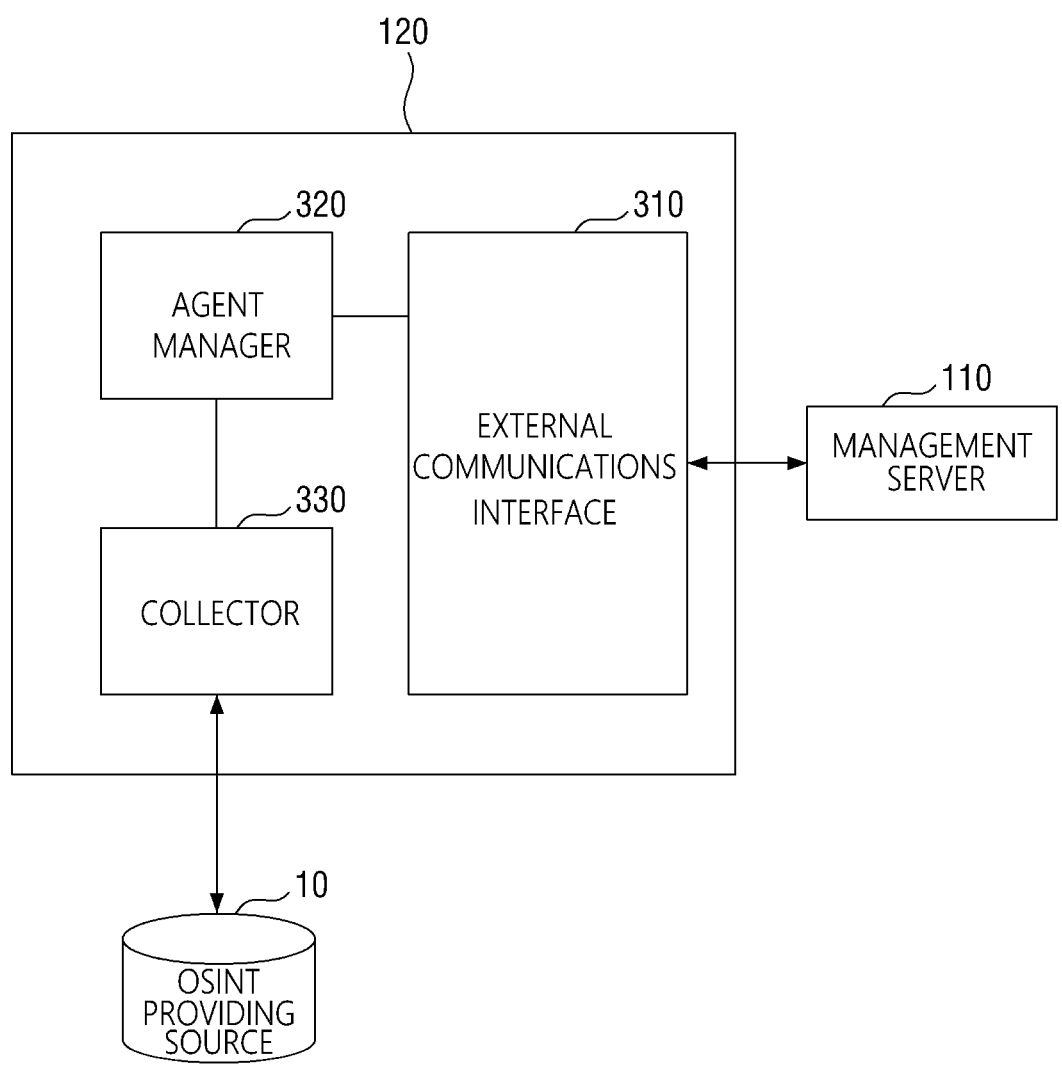
FIG. 3 is a diagram for illustrating a structure of an agent according to an exemplary embodiment of the present disclosure.

FIG. 3 is a diagram for illustrating a structure of an agent 120 according to an exemplary embodiment of the present disclosure. According to an exemplary embodiment of the present disclosure, the agent 120 may include a processor (hardware processor) and a memory from which instructions executed by the processor are loaded. In addition, the agent 120 may include an external communications interface 310, an agent manager 320, and a collector 330. The external communications interface 210 may perform communications with an external device including the management server 110.

The agent manager 320 may receive agent configuration values from the management server 110 through the external communications interface 310. The agent manager 320 may configure the collector 330 based on the agent configuration values. According to an exemplary embodiment of the present disclosure, the agent manager 320 may assign the agent configuration values to a collection channel that acquires CTI data from an OSINT providing source based on the agent configuration values. In addition, the agent manager 320 may align the processes of a data collection task so that the collector performs the processes of the data collection task. The collector 330 configured by the agent manager 320 may collect the CTI data from the OSINT providing source 10 and may provide the collected CTI data to the agent manager 320. The agent manager 320 may transmit the CTI data to the management server 110 via the external communications interface 310.

Figure 4:
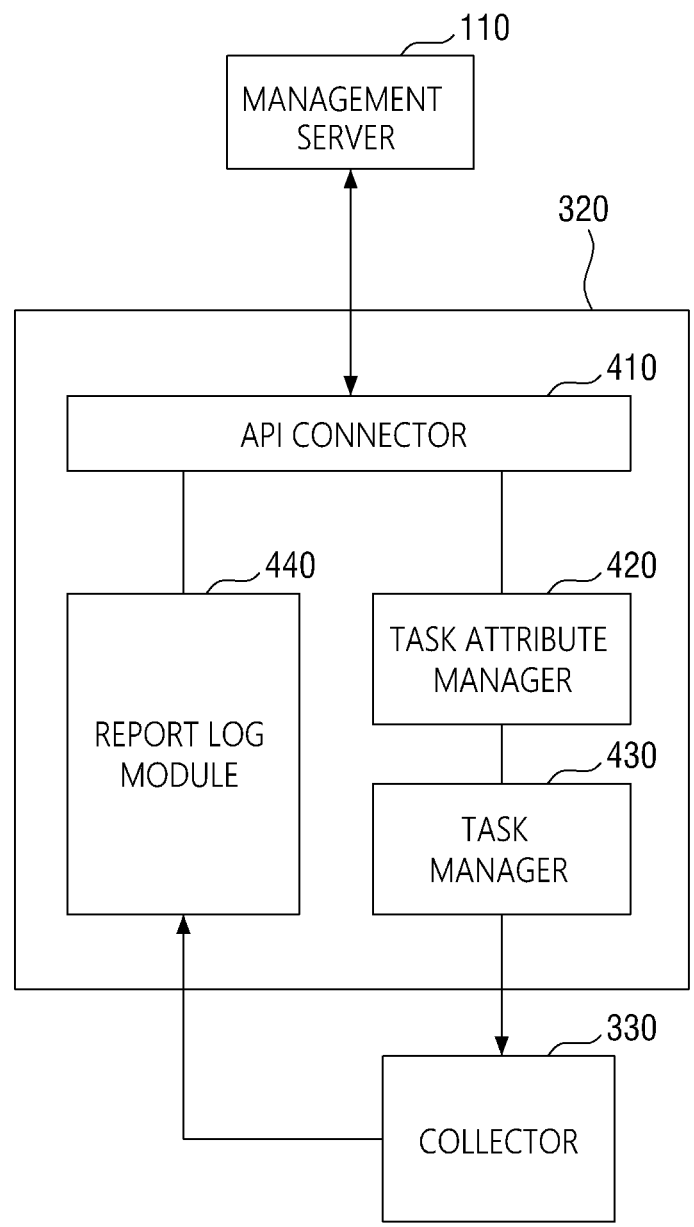
FIG. 4 is a diagram for illustrating a configuration of an agent management server according to an exemplary embodiment of the present disclosure.

FIG. 4 is a diagram for illustrating a configuration of an agent management server 320 according to an exemplary embodiment of the present disclosure. According to an exemplary embodiment of the present disclosure, the agent manager 320 may include an API connector 410, a task attribute manager 420, a task manager 430, and a report log module 440.

The API connector 410 may receive the agent configuration values via an API connection to the management server 110. The task attribute manager 420 may assign attributes for a collection channel that is used to collect the CTI data from the OSINT providing source 10 to the collector 330 based on the agent configuration values. In addition, the task manager 430 may align the processes of a data collection task and control the collector 330 to perform the aligned processes.

The report log module 440 may create a report log by cumulatively storing reports including the CTI data collected by the collector 330 and the information on the operation of the collector 330. The report log module 440 may provide the management server 110 with the CTI data and the collection status information by providing the created report log to the management server 110 through the API connector 410.

Figure 5:
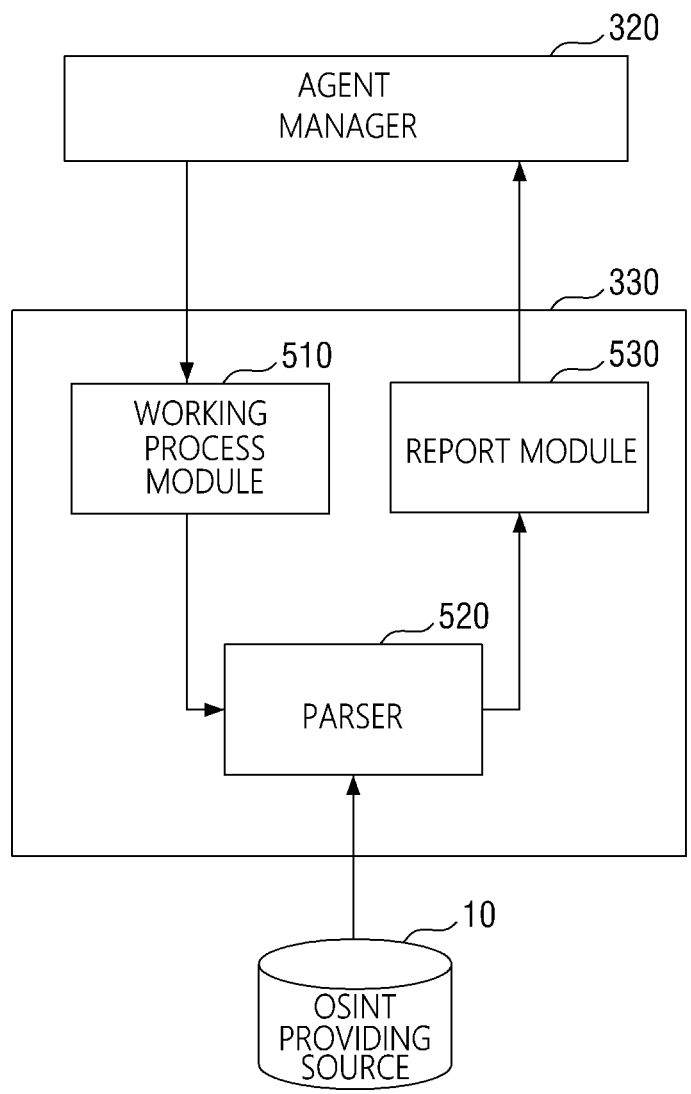
FIG. 5 is a diagram for illustrating a configuration of a collector according to an exemplary embodiment of the present disclosure.

FIG. 5 is a diagram for illustrating a configuration of a collector 330 according to an exemplary embodiment of the present disclosure. According to an exemplary embodiment of the present disclosure, the collector 330 may include a working process module 510, a parser 520, and a report module 530.

The working process module 510 may configure a VM that combines the parser 520 and performs logic associated with the received process based on the agent configuration values from the agent manager 320. The parser 520 may include modules necessary for receiving the data from the OSINT providing source 10 to extract the CTI data from the received data. According to an exemplary embodiment of the present disclosure, the working process module 510 may configure the parser 520 by selecting modules previously stored in the agent 120 based on the agent configuration values and applying at least some of the agent configuration values to the selected modules.

The report module 530 may create a report including the CTI data collected from the OSINT providing source 10 by the parser 520 and information on the operation of the collector 330 and may transmit the created report to the agent manager 320.

Figure 6:
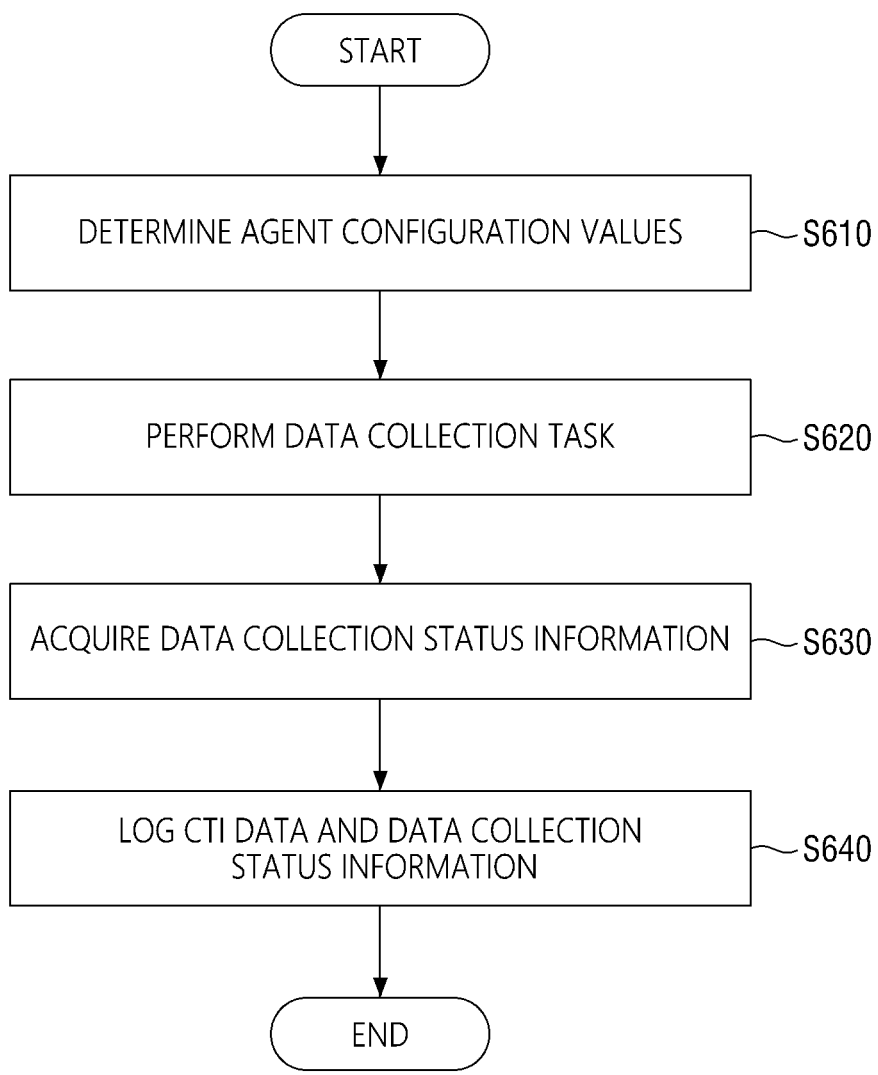
FIG. 6 is a flowchart for illustrating a process of collecting data according to an exemplary embodiment of the present disclosure.

FIG. 6 is a flowchart for illustrating a process via which a data collection system collects data according to an exemplary embodiment of the present disclosure.

Initially, the data collection system may determine agent configuration values according to OSINT providing sources (step S610).

Subsequently, the data collection system may perform a data collection task of collecting CTI data based on the agent configuration values (step S620). The data collection system may configure the agent for performing the data collection task based on the agent configuration values. Further, the data collection system may acquire data collection status information as the data collection task proceeds (step S630).

Subsequently, the data collection system may separate the collected CTI data from the data collection status information and may store them in the threat information database and the system database, respectively (step S640).

Figure 7:
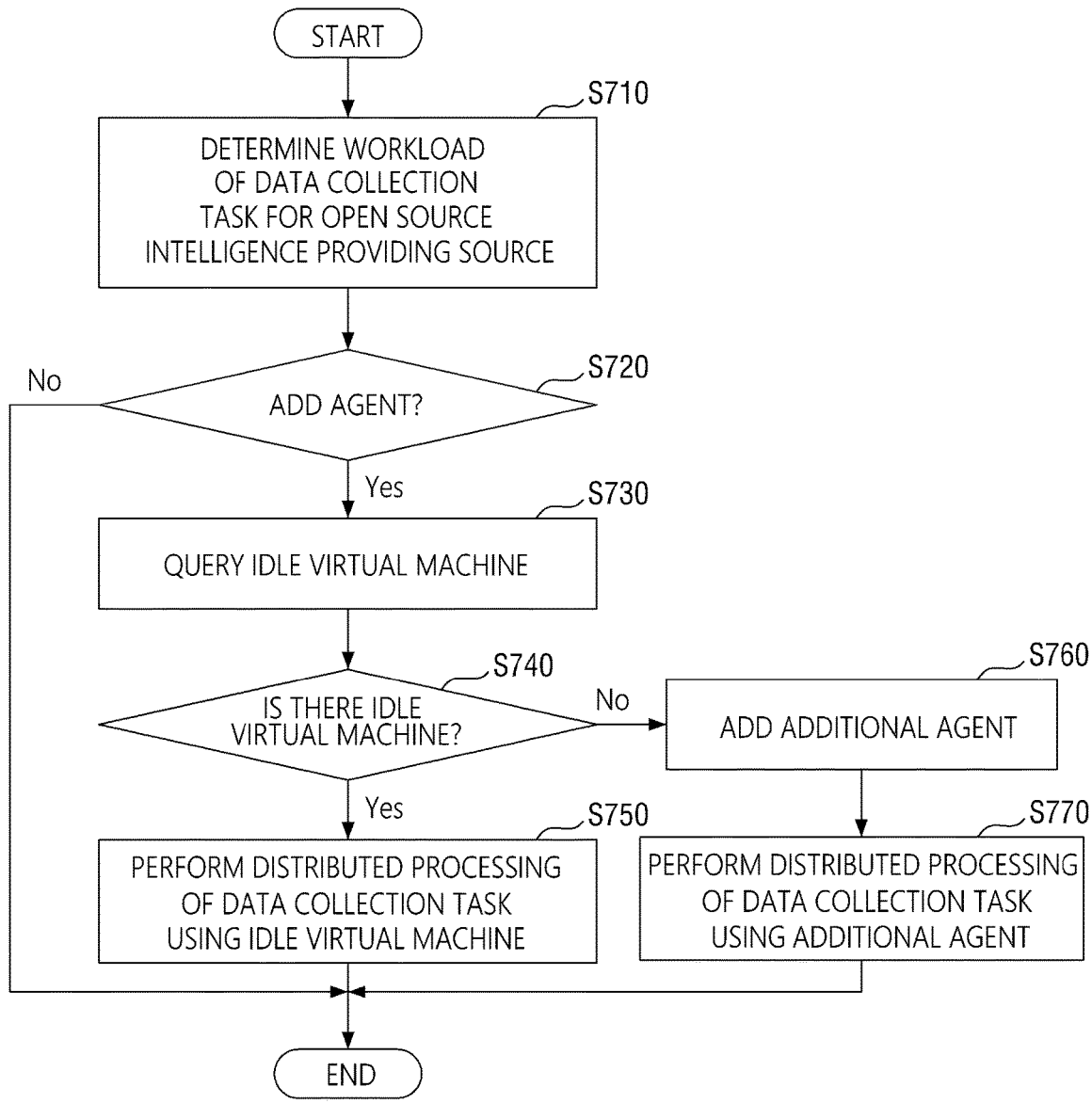
FIG. 7 is a flowchart for illustrating a process via which a data collection system performs distributed processing according to an exemplary embodiment of the present disclosure.

FIG. 7 is a flowchart for illustrating a process via which a data collection system performs distributed processing according to an exemplary embodiment of the present disclosure.

Initially, the data collection system may determine the workload of a data collection task for an OSINT providing source (step S710). Subsequently, the data collection system may determine whether to add an agent (or a VM) based on the workload (step S720). According to an exemplary embodiment of the present disclosure, the data collection system may compare the workload with the sum of the throughputs of the agents (or VMs) designated to process the data collection task and if the workload is greater than the sum of the throughputs, the data collection system may determine whether to add an agent (or a VM) to the collection channel or for the data collection task (step S720). According to another exemplary embodiment, the data collection system may determine whether to add an agent (or a VM) based on the number of agents (or VMs) relative to a predetermined workload.

According to yet another exemplary embodiment, the data collection system may add an agent (or a VM) if a new collection channel (i.e., an OSINT providing source) is added. In such case, the data collection system may determine the agent configuration values for the new collection channel and configure an additional agent or VM based on the agent configuration values.

When an agent or a VM is added, the data collection system may query whether there is an idle VM (step S730). The data collection system may determine whether there is an idle VM based on the result of the query (step S740). If there is an idle VM, the data collection system may perform distributed processing of the data collection task using the idle VM (step S750). If there is no idle VM, the data collection system may add an additional agent or VM based on the agent configuration values (step S760), and may perform the distributed processing by dividing the data collection task into sub-tasks using the added agent or VM (step S770).

Figure 8:
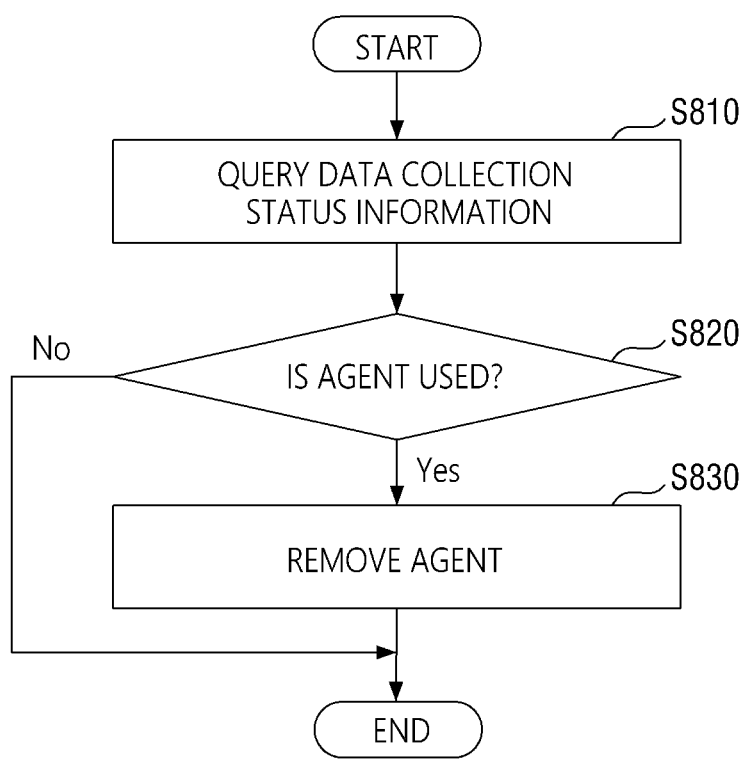
FIG. 8 is a flowchart for illustrating a process via which a data collection system removes an agent according to an exemplary embodiment of the present disclosure.

FIG. 8 is a flowchart for illustrating a process via which a data collection system removes an agent according to an exemplary embodiment of the present disclosure.

According to an exemplary embodiment of the present disclosure, the data collection system may query data collection status information in the system database to determine whether an agent is being used (step S810). The data collection system may determine whether an agent is being used based on the data collection status information (step S820). For example, if the data collection status information indicates that there is no workload of an agent over a predetermined period of time, the data collection system may determine that the agent is not used.

If it is determined that an agent is not used, the data collection system may remove the agent from the data collection system (step S830).

According to another exemplary embodiment of the present disclosure, if an OSINT providing source from which an agent collects CTI data is removed from the list of OSINT providing sources written in the system database, the data collection system may remove the agent as well.

Figure 9:
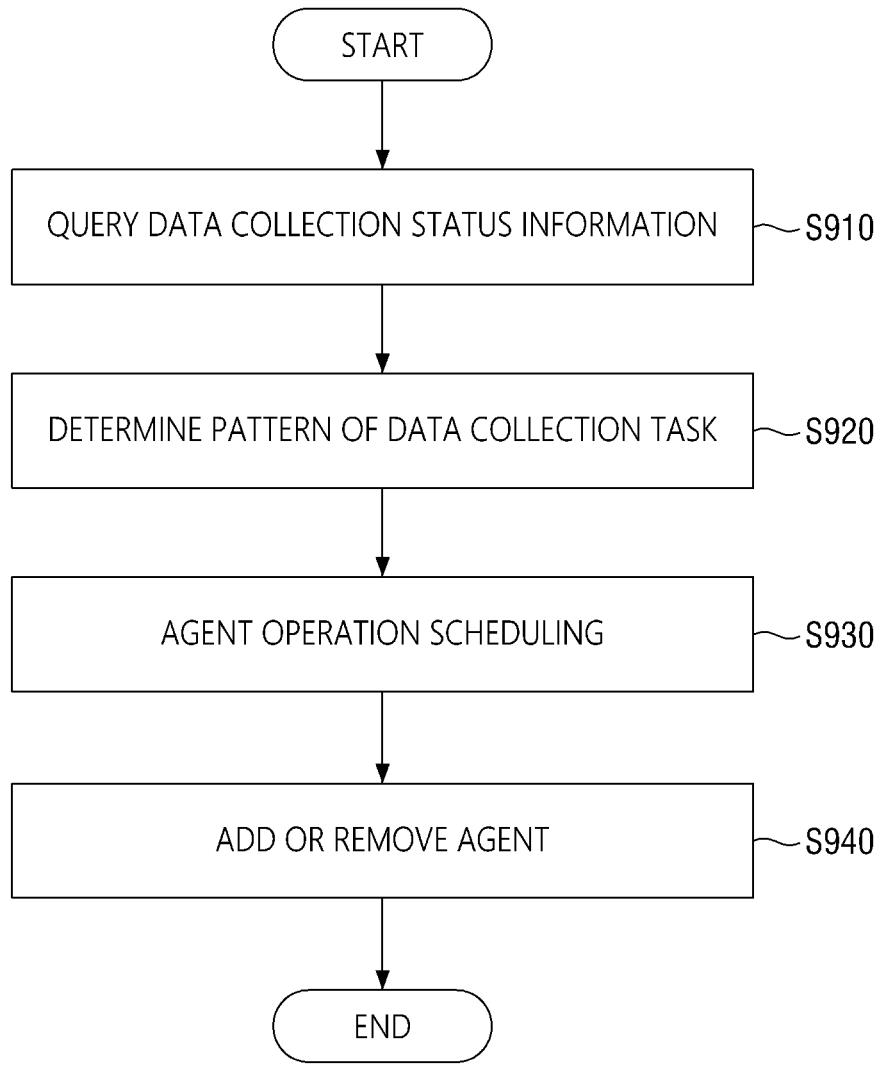
FIG. 9 is a flowchart for illustrating a process of scheduling adding or removing an agent by a data collection system according to an exemplary embodiment of the present disclosure.

FIG. 9 is a flowchart for illustrating a process of scheduling adding or removing an agent by a data collection system according to an exemplary embodiment of the present disclosure.

According to an exemplary embodiment of the present disclosure, a data collection system may query data collection status information in the system database (step S910). For example, the data collection system may query the workload of an agent.

Subsequently, the data collection system may determine a pattern that the data collection task is performed based on the data collection status information (step S920). For example, let us assume that the workload of a first agent performing the data collection task for a first OSTIN providing source repeatedly occurs between 9 AM and 11 AM on Monday, and the workload of a second agent performing the data collection task for a second OSTIN providing source repeatedly occurs between 8 AM and 10 AM on Wednesday. In this instance, the data collection system may determine the pattern for each of the OSTIN providing sources based on the workloads of the respective agents.

Subsequently, the data collection system may perform agent operation scheduling based on the pattern of the data collection task (step S930). That is to say, the data collection system may transmit the agent configuration values to the agents so that the agents are associated with the OSTIN providing sources where the data collection task occurs based on the pattern.

As a result of performing the agent operation scheduling, an agent (or VM) may be added or removed as desired (step S940).

The methods according to the embodiments of the disclosure described so far can be performed by the execution of a computer program embodied in computer-readable code. The computer program may be transmitted from a first electronic device to a second electronic device through a network such as the Internet and may be installed and used in the second electronic device. Examples of the first electronic device and the second electronic device include fixed electronic devices such as a server, a physical server belonging to a server pool for a cloud service, and a desktop PC.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A data collection system for collecting cyber threat intelligence (CTI) data provided from an open source intelligence (OSINT) providing source, the system comprising:
a management server configured to determine agent configuration values associated with the OSINT providing source;
an agent configured to receive the agent configuration values from the management server, to perform a data collection task for collecting the CTI data based on the agent configuration values, and to transmit the CTI data and data collection status information to the management server;
a threat information database where which the CTI data is logged; and
a system database where the data collection status information is logged, wherein the management server comprises:
a distributed processing determining unit, comprising software in memory executed by a processor, that determines a workload for the OSINT providing source based on the data collection status information, and determines whether or not to perform distributed processing of the data collection task based on the workload; and
a distributed processing performing unit, comprising software in memory executed by the processor, that controls the agent performing the distributed processing of the data collection task if it is determined to do so, wherein the distributed processing determining unit determines a pattern of performing the data collection task based on the data collection status information, and wherein the distributed processing performing unit removes the agent from the data collection system or adds an agent thereto based on the pattern.

2. The system of claim 1,
wherein the distributed processing determining unit determines the workload according to a type and characteristics of the OSINT providing source.

3. The system of claim 2,
wherein the agent configures a virtual machine based on the agent configuration values and performs the data collection task using the virtual machine, and
wherein the distributed processing determining unit determines the workload based on an operation time of the virtual machine included in the agent if the type and the characteristic are not identified.

4. The system of claim 1,
wherein the data collection status information contains information on an amount of packets transmitted, received or processed as the agent performs the data collection task.

5. The system of claim 1,
wherein the agent configures a virtual machine based on the agent configuration values and performs the data collection task using the virtual machine, and
wherein the distributed processing performing unit queries an idle virtual machine to perform the data collection task and controls the agent that configured the idle virtual machine so that it performs distributed processing of the data collection task if there is the idle virtual machine.

6. The system of claim 5,
wherein the distributed processing performing unit adds an additional agent to the data collection system if there is no idle virtual machine.

7. The system of claim 1,
wherein the distributed processing determining unit determines whether or not the agent is being used based on the data collection status information, and
wherein the distributed processing performing unit removes the agent from the data collection system if it is determined that the agent is not used.

8. The system of claim 1,
wherein the agent configuration values comprise a collecting manner configuration value that determines a manner of collecting the CTI data from the OSINT providing source, a data format configuration value that determines a data format of data received from the OSINT providing source, and a data location configuration value that determines a location of the CTI data within the received data.

9. The system of claim 8,
wherein the collecting manner configuration value indicates one of crawling that acquires a web page including CTI data using a crawler, API connection that acquires CTI data by connecting the OSINT providing source with the agent using an application program interface (API), a direct input that a user directly inputs the CTI data through an input device, and a shared storage from which the CTI data is acquired from a file stored therein.

10. The system of claim 1,
wherein the agent comprises
an agent management unit, comprising software in memory executed by the processor, that conducts communications with the management server, assigns the agent configuration values to a collection channel that acquires the CTI data from the OSINT providing source based on the agent configuration values, and aligns processes of the data collection tasks; and
a collector, comprising software in memory executed by the processor, that configures a parser based on the agent configuration values of the collection channel and the aligned processes, and collects the CTI data using the parser.

11. A management server for collecting cyber threat intelligence (CTI) data provided from an open source intelligence (OSINT) providing source, the server comprising:
- an environment configuring unit, comprising software in memory executed by a processor, configured to determine agent configuration values associated with the OSINT providing source;
- an external communications interface configured to transmit the agent configuration values to an agent and to receive data collection status information and the CTI data from the agent;
- a distributed processing determining unit, comprising software in memory executed by the processor, configured to determine a workload for the OSINT providing source based on the data collection status information and to determine whether to perform distributed processing of a data collection task for the OSINT providing source based on the workload; and
- a distributed processing performing unit, comprising software in memory executed by the processor, configured to determine agent configuration values so that the agent performs the distributed processing if it is determined to do so, wherein the distributed processing determining unit that determines a workload for the OSINT providing source based on the data collection status information, and determines whether or not to perform distributed processing of the data collection task based on the workload; and wherein the distributed processing performing unit controls the agent performing the distributed processing of the data collection task if it is determined to do so, wherein the distributed processing determining unit determines a pattern of performing the data collection task based on the data collection status information, and wherein the distributed processing performing unit removes the agent from the data collection system or adds an agent thereto based on the pattern.

* * * * *